UNITED STATES PATENT OFFICE.

ALCIDE F. POIRRIER, OF PARIS, FRANCE, ASSIGNOR TO THE SOCIÉTÉ ANONYME DES MATIÈRES COLORANTES ET PRODUITS CHEMIQUES DE ST. DENIS AND RAYMOND VIDAL, OF SAME PLACE.

SULFUR DYE.

SPECIFICATION forming part of Letters Patent No. 532,484, dated January 15, 1895.

Application filed June 26, 1894. Serial No. 515,772. (Specimens.) Patented in England December 7, 1893, No. 23,578; in Belgium December 16, 1893, No. 107,691; in Spain February 9, 1894, No. 15,287, and in Austria-Hungary August 21, 1894, No. 10,421.

*To all whom it may concern:*

Be it known that I, ALCIDE F. POIRRIER, a citizen of the Republic of France, and a resident of Paris, France, have invented a new and useful Improvement in the Production of Coloring-Matters, which improvement is fully set forth in the following specification, and has been patented in the following countries: England, No. 23,578, dated December 7, 1893; Belgium, No. 107,691, dated December 16, 1893; Spain, No. 15,287, dated February 9, 1894, and Austria-Hungary, No. 10,421, dated August 21, 1894.

I have found that I can obtain matters which directly dye fibers in black, blue-black, and greenish black, by causing sulfur to react on doubly substituted derivatives of benzene, such as the dihydroxyl derivatives, or the diamid derivatives. In the first class are included the dioxynaphthalenes and the naphthoquinones. In the second class are embraced the diamins of the benzene and naphthalene series, and all the substances capable of producing them.

The following examples will give a comprehension of the invention.

I. Heat for ten hours in a vessel one part of dioxynaphthalene beta 1, beta 4, 0.750 part sulfur, 0.500 part chlorhydrate of ammonia, two parts of sulfide of sodium; the temperature being 175° to 200° centigrade. The cooked mass which is bronze-black, when well dried may be pulverized and thus used directly for dyeing.

The dioxynaphthalene above mentioned may be replaced by like weight of dioxynaphthalene beta 1, beta 3, or any other dioxynaphthalene, or by a like weight of one of the known naphthoquinones.

Instead of operating in an open vessel, the operation may be conducted in a closed vessel under pressure. The products are much improved thereby.

II. Heat in an open vessel one part of paraphenylenediamin, one part of sulfur, to a temperature of from 130° to 150° centigrade. The product may be ground and in that condition used directly for dyeing. It gives beautiful shades of blue of the indigo tint. If the temperature attains 190° to 200° the shades become blue-black.

For the paraphenelenediamin may be substituted a corresponding ortho-diamin; or the corresponding nitramins, the diamin naphthalenes, the amido azo benzene, the indamins, cresylenediamins, &c. In the latter case it is advisable preliminarily to boil the first matter with a concentrated solution of sulfide of sodium, and to add the sulfur after the splitting of this matter.

The products constitue a new class of coloring matters which have not heretofore been obtained in crystalline form. They have the aspect of a porous grayish or bronze-like powder, are soluble in pure water (to which they impart a bottle-green color) very soluble in alkaline solutions (particularly sodium sulfid), insoluble in acids. They are chiefly distinguished by their strong affinity for fiber, having the property of dyeing unmordanted vegetable fiber. The neutral solutions are readily changeable upon exposure to air or to oxidizing agents, forming insoluble oxidized compounds, which however are readily reduced by suitable reducing agents, such as alkaline sulfids. For this reason, and because the coloring matters do not dye fiber well in the oxidized condition, the best method of procedure consists in dyeing in a medium of alkaline sulfid, such as sodium sulfid. On the other hand, it is the oxidized colors that possess great beauty of shade, and hence, after dyeing, the colors are definitely fixed either by prolonged exposure to air or more rapidly by the use of chromates, bichromates, or other oxidizing agents.

The intensity of the shade imparted to the fibers varies from blue-black to black, according to the strength of the dyeing solution.

Having thus described my invention, what I claim as new is—

1. The herein described process of producing coloring matters capable of directly dyeing fiber, which process consists in heating with sulfur or sulfur compounds, the doubly-substituted derivatives of benzene herein specified.

2. The described coloring matters having the property of directly dyeing fiber in black or blackish shades, said coloring matters being very soluble in water, alkaline solutions and alkaline sulfids, insoluble in acid, and changeable upon exposure to air, as set forth.

In testimony whereof I have signed this specification in the presence of two subscribing witnesses.

ALCIDE F. POIRRIER.

Witnesses:
JULES ARMENGAUD, Jeune,
EDWARD P. MACLEAN.